US009153085B2

(12) United States Patent
Euchner et al.

(10) Patent No.: US 9,153,085 B2
(45) Date of Patent: Oct. 6, 2015

(54) VOTING SYSTEM THAT ALLOWS VOTERS TO SECURELY VERIFY THEIR VOTES

(75) Inventors: James A. Euchner, Waccabuc, NY (US); Bertrand Haas, New Haven, CT (US)

(73) Assignee: Pitney Bowes Inc., Stamford, CT (US)

( * ) Notice: Subject to any disclaimer, the term of this patent is extended or adjusted under 35 U.S.C. 154(b) by 2560 days.

(21) Appl. No.: 11/801,922

(22) Filed: May 11, 2007

(65) Prior Publication Data

US 2008/0281682 A1 Nov. 13, 2008

(51) Int. Cl.
*G06F 11/00* (2006.01)
*G07C 13/00* (2006.01)

(52) U.S. Cl.
CPC ...................................... *G07C 13/00* (2013.01)

(58) Field of Classification Search
USPC .................................. 705/12; 283/5; 235/386
See application file for complete search history.

(56) References Cited

U.S. PATENT DOCUMENTS 7,438,213 B2 * 10/2008 Ackley et al. ................. 229/301
2002/0169756 A1 * 11/2002 Biddulph .......................... 707/3
2002/0175514 A1 * 11/2002 Warther ............................ 283/5
2005/0139666 A1 * 6/2005 Chou ............................ 235/386

* cited by examiner

*Primary Examiner* — Tsan-Yu J Huang
(74) *Attorney, Agent, or Firm* — Brian A. Lemm; Charles R. Malandra, Jr.; Steven J. Shapiro

(57) ABSTRACT

Various election methods are provided wherein voters are able to verify their votes through public means. In one embodiment, each of the ballots includes a ballot identifier and each of the choices thereon is associated with a selection identifier. After the completed ballots are received by the voting authority, the authority publishes the ballot identifiers obtained from the ballots in association with the selection identifiers of the selected choices to enable each voter to verify his or her vote. In another embodiment, the voter provides the ballot identifier and the selection identifiers of the selected choices on a delivery mechanism (e.g., envelope). The relevant identifiers are then obtained by the authority from the delivery mechanisms and published. In another embodiment, the voters generate their own selection identifiers on the ballot which are then published by the authority to enable each voter to verify his or her vote.

19 Claims, 7 Drawing Sheets

VOTING SYSTEM THAT ALLOWS VOTERS TO SECURELY VERIFY THEIR VOTES

FIELD OF THE INVENTION

The present invention relates to voting systems, and in particular to voting systems that enable voters to verify their votes in a secure manner. Preferably, the voting system is a vote by mail voting system.

BACKGROUND OF THE INVENTION

In democratic countries, governmental officials are chosen by the citizens in an election. Conducting an election and voting for candidates for public office in the United States can be performed in several different ways. One such way utilizes mechanical voting machines at predetermined polling places. When potential voters enter the predetermined polling place, voting personnel verify that each voter is properly registered in that voting district and that they have not already voted in that election. Thus, for a voter to cast his vote, he must go to the polling place at which he is registered, based on the voter's residence. Another method for conducting an election and voting utilizes paper ballots that are mailed to the voter who marks the ballot and returns the ballot to the voting authority running the election through the mail. In the usual vote by mail process, the voter marks the ballot to cast his/her vote and then inserts the ballot in a return envelope which is typically pre-addressed to the voter registrar office in the corresponding county, town or locality in which the voter is registered. The voter typically appends his/her signature on the back of the envelope adjacent his/her human or machine readable identification.

When the return envelope is received at the registrar's office of the voting authority, a voting official compares the voter signature on the envelope with the voter signature retrieved from the registration file to make a determination as to whether or not the identification information and signature are authentic and valid, and therefore the vote included in the envelope should be counted. If the identification information and signature are deemed to be authentic and valid, the identifying information and signature are separated from the sealed ballot before it is handed to the ballot counters for tabulation. In this manner, the privacy of the voter's selections is maintained and thus the ballot remains a "secret ballot."

Prior art voting systems, and in particular vote by mail systems as just described, suffer from a number of drawbacks, including the fact that in many cases they lack security and the fact that the vote counting can potentially be modified without being detected. In such systems, voters have no other choice but to trust the voting officials to verify that their votes have been counted, and counted as the voter intended. Voting by mail is becoming more prevalent (apart from the usual absentee voting), and in some jurisdictions, entire elections are being conducted exclusively by mail. Thus, there exists a need for a voting system, and preferably a vote by mail system, that gives voters confidence that their votes have been counted as intended by allowing the voters to verify their votes in a secure manner.

SUMMARY OF THE INVENTION

In one embodiment, the invention provides a method of processing ballots in an election, wherein the election includes one or more voting categories and wherein each of the voting categories includes one or more choices. The method includes providing a ballot to each of the voters, wherein each ballot includes a unique ballot identifier and each of the one or more choices of each voting category. In addition, each of the choices has associated therewith a selection identifier, which is preferably generated at random. The method further includes receiving from each of the voters the voter's ballot after the voter has selected on the ballot one of the choices in each of one or more of the one or more voting categories such that the ballot has one or more selected choices, obtaining from each of the received ballots: (i) the ballot identifier provided thereon, and (ii) the selection identifier associated with each of the one or more selected choices provided on the ballot, and publishing for each of the ballots the ballot identifier obtained from the ballot in association with the selection identifier associated with each of the one or more selected choices obtained from the ballot. The publishing step may comprise including in a database accessible by the voters for each of the ballots the ballot identifier obtained from the ballot in association with the selection identifier associated with each of the one or more selected choices obtained from the ballot. Furthermore, the obtaining step may be automated by employing optical character recognition. The method may also further include instructing each of the voters to record the ballot identifier provided on the voter's ballot and the selection identifier associated with each of the one or more selected choices provided on the voter's ballot for later use by the voter to verify his or her vote. In the preferred embodiment, the election is at least partially a vote by mail election and the receiving step comprises receiving in the mail from each of the voters the ballot received by the voter.

In another embodiment, the invention provides a method of processing ballots in an election, wherein the election includes one or more voting categories and wherein each of the voting categories includes one or more choices. The method includes providing a ballot to each of the voters, wherein each ballot includes a unique ballot identifier and each of the one or more choices of each of the one or more voting categories, and wherein each of the choices has associated therewith a selection identifier, which is preferably generated at random. The method further includes receiving from each of the voters the ballot received by the voter after the voter has selected on the ballot one of the choices in each of one or more of the one or more voting categories such that the ballot has one or more selected choices. In this embodiment, each ballot is received in a ballot delivery device, such as an envelope, wherein for each ballot the ballot delivery device has provided thereon: (i) the ballot identifier provided on the ballot, and (ii) the selection identifier associated with each of the one or more selected choices provided on the ballot. The method further includes obtaining from each of the received ballot delivery devices: (i) the ballot identifier provided thereon, and (ii) the selection identifier associated with each of the one or more selected choices provided thereon, and publishing for each of the received ballot delivery devices the ballot identifier obtained therefrom in association with the selection identifier associated with each of the one or more selected choices obtained therefrom. The publishing step may comprise including in a database accessible by the voters for each of the ballot delivery devices the ballot identifier obtained therefrom in association with the selection identifier associated with each of the one or more selected choices obtained therefrom. Furthermore, the obtaining step may be automated by employing optical character recognition. In the preferred embodiment, the election is at least partially a vote by mail election and the receiving step comprises receiving in the mail from each of the voters the ballot received by the voter.

In yet another embodiment, the invention provides a method of processing ballots in an election, wherein the election includes one or more voting categories and wherein each of the voting categories includes one or more choices. The method in this embodiment includes providing a ballot to each of the voters, receiving from each of the voters the ballot received by the voter after the voter has: (i) selected on the ballot one of the choices in each of one or more voting categories such that the ballot has one or more selected choices, and (ii) provided on the ballot for each of the one or more selected choices a selection identifier associated with the selected choice, wherein each selection identifier is chosen by the voter, obtaining from each of the received ballots the selection identifier associated with each of the one or more selected choices provided on the ballot, and publishing each of the selection identifiers in association with the one of the choices with which it is associated. In one particular embodiment, the voter chooses each selection identifier by randomly making it up and writing it on the voter's ballot. In another particular embodiment, the voter chooses each selection identifier by creating a two dimensional barcode representing the selection identifier on the voter's ballot. In this embodiment, the step of providing a ballot to each of the voters comprises providing a ballot having an empty barcode array adjacent to each of the choices, and wherein each two dimensional barcode is created by filling in a plurality of modules in one or more of the empty barcode arrays. Furthermore, the obtaining step may be automated by employing optical character recognition. Preferably, the method comprises instructing each of the voters to record the selection identifier associated with each of the one or more selected choices provided on the voter's ballot for later use by the voter to verify his or her vote. Alternatively, the selection numbers may be recorded by the voter when written using, for example, carbon paper or the like. Also, the election is preferably at least partially a vote by mail election and wherein the receiving step comprises receiving in the mail from each of the voters the ballot received by the voter. In addition, the publishing step preferably comprises including in a database accessible by the voters each of the selection numbers in association with the one of the choices with which it is associated.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
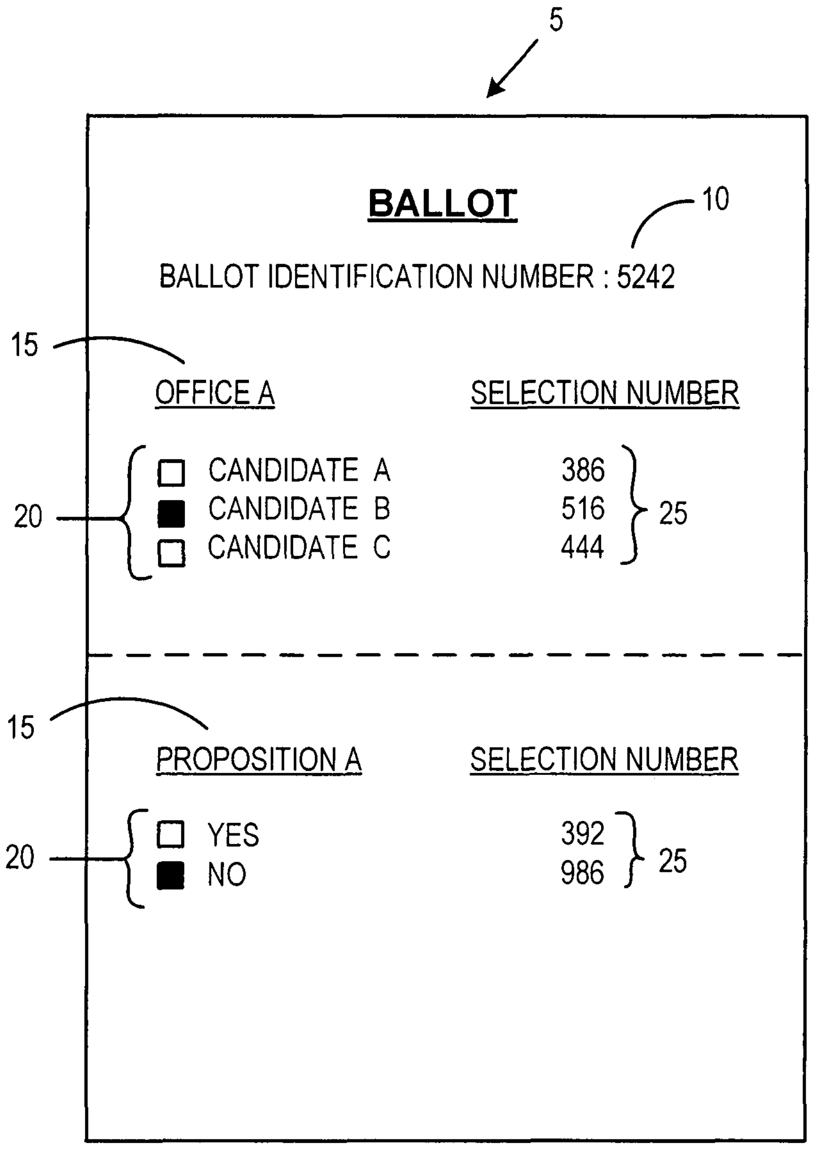
FIG. 1 is a schematic diagram of a ballot according to one embodiment of the present invention that may be used in a voting system, which in the preferred embodiment is a vote by mail system.

FIG. 1 is a schematic diagram of a ballot 5 according to one embodiment of the present invention that may be used in a voting system, which in the preferred embodiment is a vote by mail system. In the preferred embodiment, a plurality of ballots 5 are mailed to the voters in the district to enable the voters to cast their votes by making selections on the ballots 5 and returning them to the voting authority for the district. The ballot 5 includes a ballot identifier 10 that is unique to the ballot 5 (i.e., each ballot 5 used in the voting system has a unique ballot identifier 10). The ballot identifier 10 for each ballot 5 is preferably randomly generated by the voting authority, and may be, for example, numeric or alphanumeric, and is kept dissociated from the identity of the voter receiving the ballot 5. The ballot 5 also includes one or more voting categories 15 for which the voters will be casting votes in the election. Each voting category 15 includes one or more choices 20, which may be a number of candidates for a particular office or a number of answers for a proposition. The voter may indicate his or her vote in each voting category 15 by checking or filling in a box that is provided next to each choice 20 (other methods, such as, without limitation, chads, are also possible). In addition, as seen in FIG. 1, each choice 20 has associated therewith a selection identifier 25. For each ballot 5, the selection identifiers are randomly generated, may be, for example, numeric or alphanumeric, and associated with the choices 20 by the voting authority. Thus, if two ballots 5 are drawn at random, the chances of the choices 20 on each ballot 5 being associated with the same selection identifiers 25 is low (the larger the number of choices 20, the lower the chances). The chances of the choices on each ballot 5 being associated with the same selection identifiers 25 can be reduced to zero by using a random number generator to generate each selection identifier 25 and having the voting authority test each selection identifier 25 for repetition when generating the ballots 5, or by using a pseudo-random number generator to generate the selection identifiers 25 and using a different seed for each ballot 5.

Figure 2:
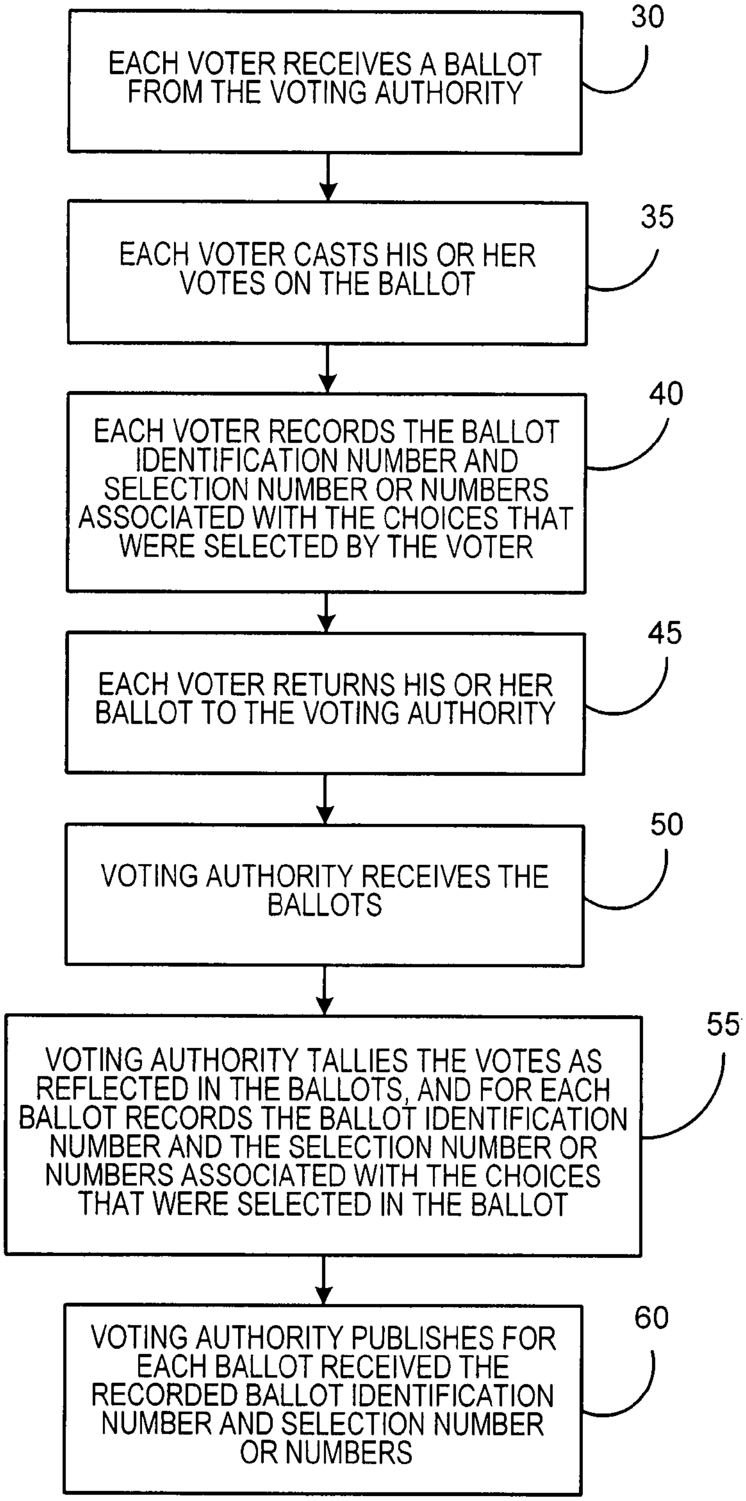
FIG. 2 is a flowchart illustrating a voting method which employs the ballot shown in FIG. 1 according to one embodiment of the invention.

FIG. 2 is a flowchart illustrating a voting method which employs the ballot 5 shown in FIG. 1 according to one embodiment of the invention. The method begins at step 30, wherein each voter receives a ballot 5 from the voting authority. In the preferred embodiment, the voter receives the ballot from the voting authority in the mail. Next, at step 35, each voter casts his or her votes on the ballot 5 by selecting particular ones of the choices 20 on the ballot 5. At step 40, each voter then records (for later use by the voter as described herein) the ballot identifier 10 of the voter's ballot 5 and the selection identifier or identifiers 25 that are associated with the choices 20 that were selected by the voter. For example, for the selections made in the example ballot 5 shown in FIG. 1, the voter that received that ballot 5 and made those selections would record the number 5242 516 986. Preferably, the voter will record those numbers in a manner that ensures that the voter will have access thereto at a later time, for example, by writing the number down on a piece of paper he or she retains or by entering the number into a personal digital assistant.

Next, at step 45, each voter returns his or her ballot 5 to the voting authority. In the preferred embodiment, the ballots 5 are returned to the voting authority by mail. At step 50, the voting authority receives the ballots 5 from each of the voters. Next, at step 55, the voting authority tallies the votes that are reflected in the ballots 5 (i.e., the choice 20 selected by each voter), and for each ballot 5 records and preferably stores in a database the ballot identifier 10 and the selection identifier or identifiers 25 associated with the choices 20 that were selected in the ballot 5. For example, when the example ballot 5 shown in FIG. 1 is received by the voting authority, the voting authority would tally one vote for candidate B in the voting category 15 identified as "Office A" and one vote for NO in the voting category 15 identified as "Proposition A." Finally, at step 60, the voting authority publishes for each ballot 5 that was received the recorded ballot identifier 10 and selection identifier or identifiers 25. For example, for the example ballot 5 shown in FIG. 1, the voting authority would publish the following number: 5242 516 986. The voting authority may publish the recorded ballot identifiers 10 and associated selection identifier or identifiers 25 in the form of a public database accessible through, for instance, the Internet. It should be appreciated, however, that publication includes any method of making available one or more of the ballot identifiers 10 and associated selection identifiers 25, and as such other methods of publication are also possible. Each voter can than freely check the publication (e.g., check the database) to ensure that his or her vote was counted as intended. The publication of the ballot identifiers 10 is of no use to determine who has voted and has not voted since the ballot identifiers 10 are randomly associated with voters. Moreover, even if a ballot identifier 10 is compromised, that is, if the identity of a voter and his or her associated ballot identifier 10 become known, the published selection identifier or identifiers 25 are of no use to see how the voter has voted since for each ballot 5, the selection identifiers 25 are associated with the choices 20 in a random manner. Only the voter himself or herself can verify that his or her vote was correctly recorded by matching the published ballot identifier 10 and associated selection identifiers 25 with the ones he or she has previously recorded (step 40). As a result, the method shown in FIG. 2 ensures complete anonymity for voters. Furthermore, it is impossible for a voter to prove that he or she selected a particular choice 20 (e.g., voted for a particular candidate) since the only association of the selection identifiers 25 with the choices 20 is on either the ballot 5 and the place where the voter recorded those numbers for himself or herself. However, since the voter can record whatever he or she wants, like a different selection identifier 25/choice 20 association than actually appears the voter's ballot 5, the voter's record is no guarantee to a potential vote buyer that it is the same as that cast on the actual ballot 5. Therefore, the method shown in FIG. 2 also solves the problem of vote buying/trading.

Figure 3:
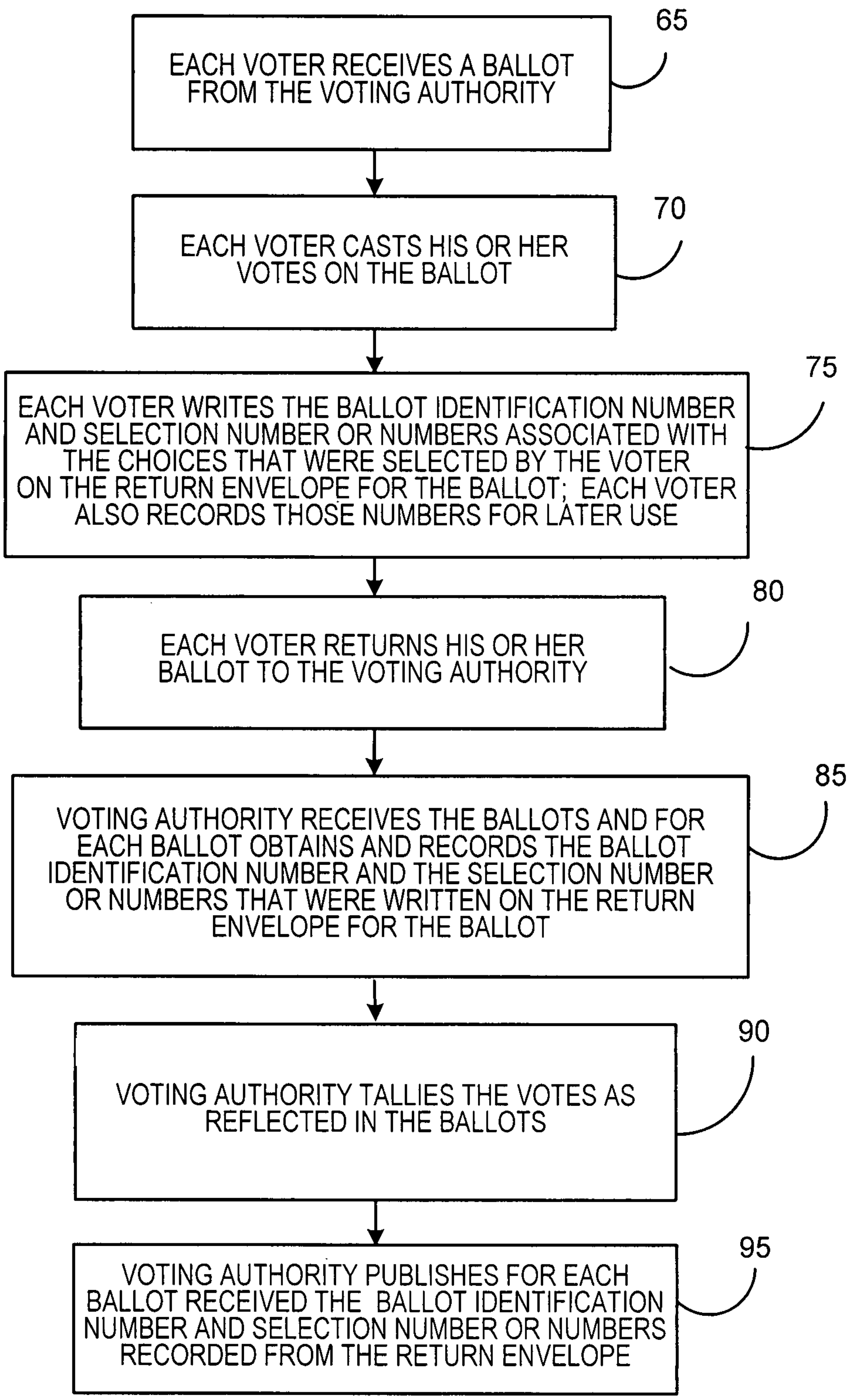
FIG. 3 is a flowchart illustrating a voting method according to an alternative embodiment of the invention that employs the ballot shown in FIG. 1.

FIG. 3 is a flowchart illustrating a voting method according to an alternative embodiment of the invention that employs the ballot 5 shown in FIG. 1. The method begins at step 65, wherein each voter receives a ballot 5 from the voting authority. Again, the ballots 5 are received by mail in the preferred embodiment. At step 70, each voter then casts his or her votes on the ballot 5 by selecting particular choices 20. Next, at step 75, each voter writes the ballot identifier 10 and selection identifier or identifiers 25 associated with the choices 20 that were selected by the voter on the delivery mechanism that is used to return the ballot 5 to the voting authority, which in the preferred embodiment is a return envelope. For example, for the ballot 5 shown in FIG. 1, the voter would write the number 5242 516 986 on the delivery mechanism. Preferably, the ballot identifier 10 and associated selection identifier or identifiers 25 are written on each ballot 5 in a designated area. Each voter also records those numbers for later use as described elsewhere herein. At step 80, each voter returns his or her ballot to the voting authority, which in the preferred embodiment is by mail. Next, at step 85, the voting authority receives the ballots 5 and for each ballot 5 obtains and records, such as by storing in a database or the like, the ballot identifier 10 and the selection identifier or identifiers 25 that were written on the delivery mechanism (e.g., return envelope) for the ballot 5. For example, for the ballot 5 shown in FIG. 1, the voting authority would obtain and record the number 5242 516 986. The ballot identifier 10 and the selection identifier or identifiers 25 may be obtained from each return envelope by automatic means, such as by using optical character recognition, or by manual means. At step 90, the voting authority then tallies the votes as reflected in the received ballots 5. Finally, at step 95, the voting authority publishes for each ballot 5 received the ballot identifier 10 and selection identifier or identifiers 25 recorded from the return envelope. This publication may occur in the manner described in connection with the method in FIG. 2. Thus, in this embodiment, each voter can freely consult the publication (e.g., look in the published database) to ensure that his or her ballot 5 was received by the voting authority. However, in this embodiment, because the published ballot identifiers 10 and associated selection identifier or identifiers 25 are obtained from the delivery mechanism as opposed to from the ballot 5 itself, each voter has to trust that after receipt the vote was counted correctly.

Figure 4:
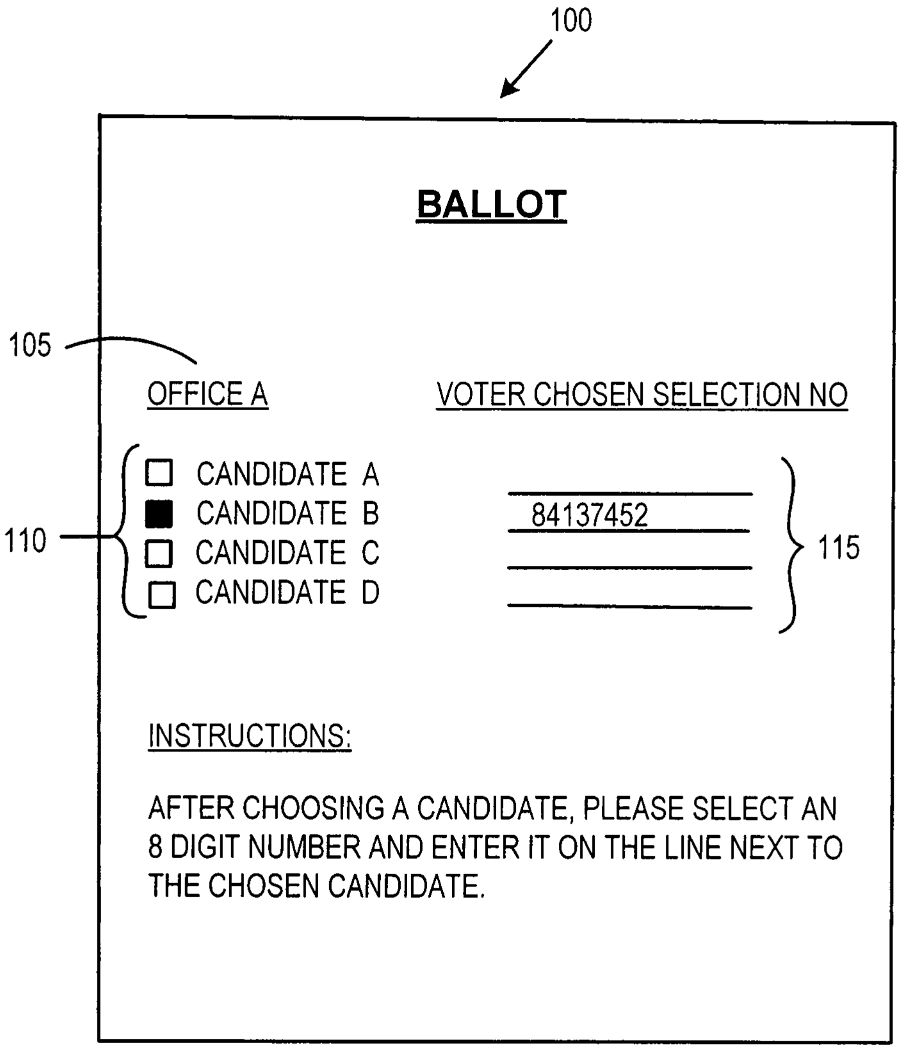
FIG. 4 is a schematic diagram of a ballot according to an alternative embodiment of the present invention that may be used in a voting system, which in the preferred embodiment is a vote by mail system.

FIG. 4 is a schematic diagram of a ballot 100 according to an alternative embodiment of the present invention that may be used in a voting system, which in the preferred embodiment is a vote by mail system. In this embodiment, the voter enters selection identifiers on the ballot that are chosen by the voter. The ballot 100 includes one or more voting categories 105 for which the voters will be casting votes in the election. Each voting category 105 includes one or more choices 110, which may be a number of candidates for a particular office or a number of answers for a particular proposition. The voter may indicate his or her vote in each voting category 105 by checking or filling in a box that is provided next to each choice 110 (other methods, such as chads, are also possible). In addition, as seen in FIG. 4, each choice 110 has provided adjacent thereto a selection identifier entry space 115. In this embodiment, after the voter selects a choice 110 in each voting category 105, the voter then makes up and enters a selection identifier 120 in the selection identifier entry space 115 provided adjacent to the selected choice 110. Preferably, the voter is given instructions which specify the parameters of the selection identifiers 120 that may be entered (for example, they must be 8 digits long, numeric or alphanumeric, etc.). In the example shown in FIG. 4, the voter has selected the choice

110 which represents Candidate B, and has chosen 84137452 as the selection identifier 120. Optionally, the ballot 100 may be provided with a carbon copy that the voter can retain as a record of the selection identifier 120 chosen by the voter.

Figure 5A:
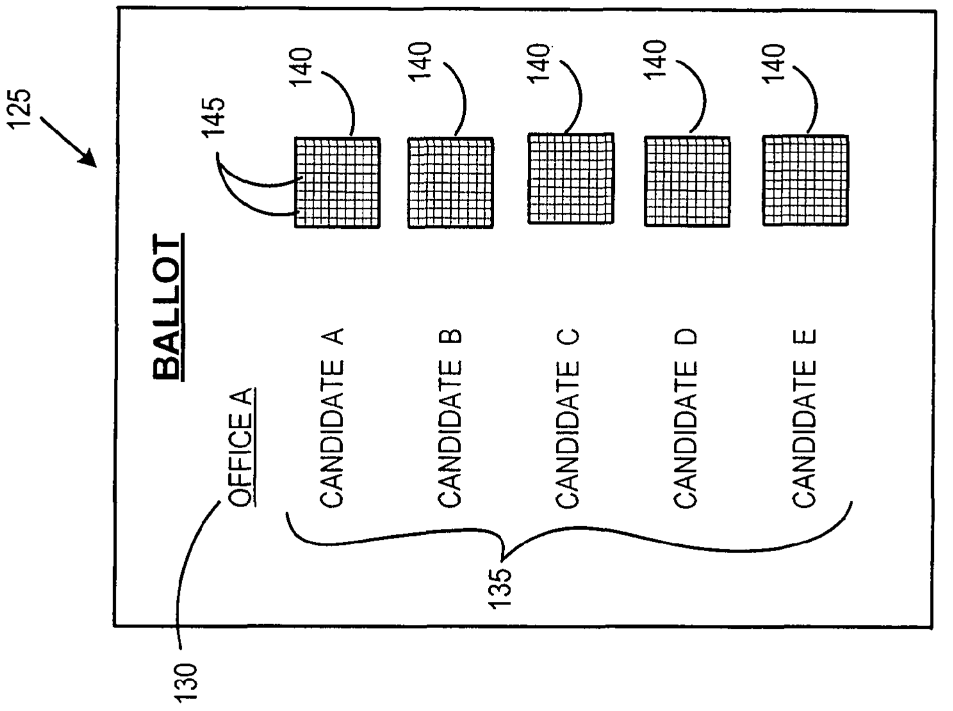
FIGS. 5A and 5B are schematic diagrams of a ballot according to a further alternative embodiment of the present invention that may be used in a voting system, which in the preferred embodiment is a vote by mail system.
Figure 5B:
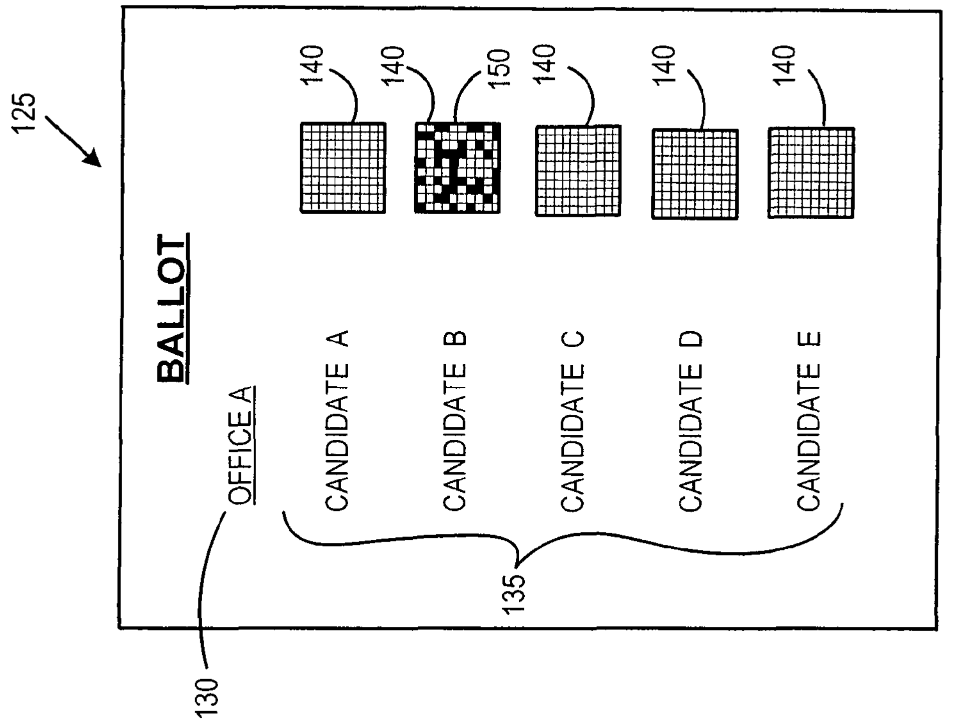

One limitation of the ballot 100 shown in FIG. 4 is that since the voters choose (i.e., generate or make up) their own selection identifiers 120, it is possible that two voters could accidentally choose the same selection identifier 120 for a choice 110. The chance of such an accident happening decreases as the length of the selection identifier 120 increases. FIGS. 5A and 5B are schematic diagrams of a ballot 125 according to a further alternative embodiment of the present invention that may be used in a voting system, which in the preferred embodiment is a vote by mail system. In this embodiment, like in the ballot 100, the voter enters selection identifiers that are chosen by the voter; however, in this embodiment the voter chooses each selection identifier by creating a two-dimensional barcode on the ballot 125. The ballot 125 may also optionally be provided with a carbon copy that the voter can retain as a record of the two-dimensional barcode created by the voter. As is known, a two-dimensional barcode, such as a Data Matrix symbol, typically consists of a number of data regions having nominally square modules arranged in an array, wherein each module generally represents one bit of data. For a black and white two-dimensional barcode, a darkened (i.e., filled) module typically represents a binary "one" and a light (i.e., empty) module typically represents a binary "zero," although the opposite scheme may also be used. In this manner, the two dimensional barcode may be used to represent a number in binary form. Two-dimensional barcodes may be automatically read and decoded by a barcode reader to obtain the data (e.g., number) represented thereby.

FIG. 5A shows the ballot 125 before the voter's vote has been cast, and FIG. 5B shows the ballot 125 after the voter's vote has been cast. The ballot 125 includes one or more voting categories 130 for which the voters will be casting votes in the election. Each voting category 130 includes one or more choices 135, which may be a number of candidates for a particular office or a number of answers for a particular proposition. In addition, each choice 130 has provided adjacent thereto an empty barcode array 140 consisting of a plurality of empty modules 145. In this embodiment, after the voter selects a choice 135 in each voting category, the voter then creates a completed barcode 150 in each voting category 130 by randomly filling in a plurality of the modules 145 of the empty barcode array 140 provided adjacent to the selected choice 135. The number represented by the completed barcode 150 (the number represented by the binary number resulting from the filled in modules 145) is the identifier number for that choice 135. The voter can bring a copy of the completed barcode (or the carbon copy if provided) to a verification site, such as, for example, a municipal building or the like, that maintains suitable processing equipment, such as a personal computer or the like that is coupled to the Internet, and a barcode scanner that will enable the voter to scan the barcode and verify that his or her vote was counted as intended.

For example, the empty barcode array 140 may be a 10 by 10 two dimensional array of modules 145, which results in $2^{100}$ possibilities of how the empty barcode array 140 can be filled in. In that case, if the empty barcode arrays 140 were truly filled in at random by the voters and if the number of voters was one billion ($2^{30}$), the chances of encountering a collision would be on the order of one out of two trillion ($2^{41}$). Preferably, the voter is given instructions which specify that the voter is to fill in the empty barcode array 140 in a manner that appears to be random.

In a further embodiment, means for assisting the voters in choosing the selection identifiers 120 shown in FIG. 4 may be employed to encourage randomness and lessen the chances that two voters will accidentally choose the same selection number 120 for a choice 110. For example, the voters may be provided with links to web pages that include random number generators.

Figure 6:
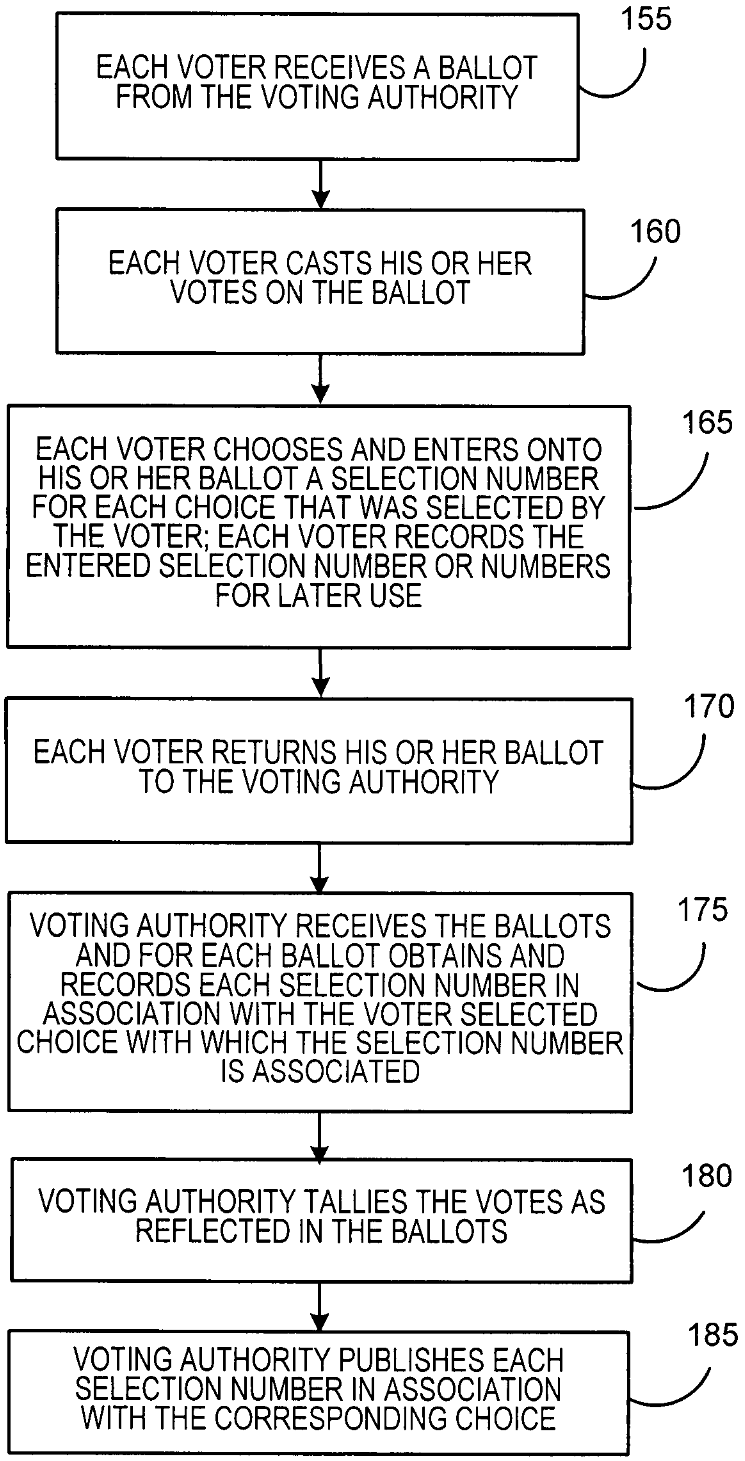
FIG. 6 is a flowchart illustrating a voting method according to an alternative embodiment of the present invention which may employ a ballot wherein the voter chooses his or her own selection identifiers for each choice that was selected.

FIG. 6 is a flowchart illustrating a voting method according to an alternative embodiment of the present invention which may employ a ballot wherein the voter chooses his or her own selection identifiers for each choice that was selected. The method of FIG. 6 may thus in one particular embodiment employ the ballot 100 shown in FIG. 4 and in another particular embodiment employ the ballot 125 shown in FIGS. 5A and 5B. For illustrative purposes, the method shown in FIG. 6 will be described in connection with a ballot 100. The method begins at step 155, wherein each voter receives a ballot 100 from the voting authority. At step 160, each voter casts his or her votes on the ballot 100 by filling in the block provided adjacent to the choice 110 in each voting category 105 that the voter wishes to select. Next, at step 165, each voter chooses and enters onto his or her ballot 100 a selection identifier 120 for each choice 110 that was selected by the voter. In the example shown in FIG. 4, the voter has chosen the choice representing candidate B and has entered as the selection identifier 120 the number 84137452. Each voter then records the entered selection identifier or identifiers 120 for later use as described elsewhere herein, or optionally retains the carbon copy of the ballot 100 (or a portion thereof) that includes the selection identifiers 120 chosen by the voter.

Figure 7:
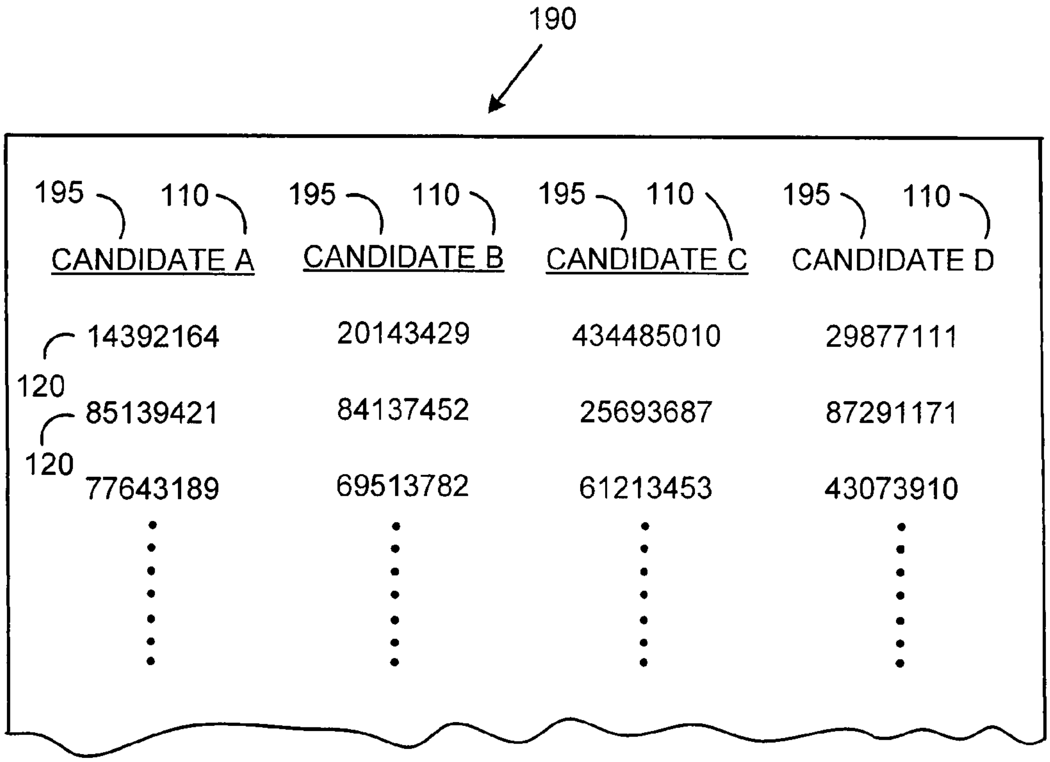
FIG. 7 is a schematic illustration of one embodiment of a table which may be used by the voting authority to publish the selection identifiers in the voting method shown in FIG. 6.

Each voter then, at step 170, returns his or her ballot 100 to the voting authority. In the preferred embodiment, the voter returns his or her ballot 100 through the mail. Next, at step 175, the voting authority receives the ballots 100 from each voter and for each ballot 100 obtains and records each selection identifier 120 in association with the voters selected choice 110 with which the selection identifier 120 is associated. Thus, in the example shown in FIG. 4, the voting authority would store the selection identifier 120 which is 84137452 with the choice 110 of Candidate B. Step 175 may be performed using automatic means, such as using optical character recognition. In addition, the selection identifiers 120 are preferably stored in association with the appropriate choices 110 in a database. At step 180, the voting authority than tallies the votes as reflected in the ballots 100. Finally, at step 185, the voting authority publishes each selection identifier 120 that was recorded in step 175 in association with the corresponding choice 110. For example, the voting authority may enter the selection identifiers 120 in a table 190 as shown in FIG. 7 which is then published either on-line at a particular website, in a publication such as a newspaper, or by any other suitable method. As seen in FIG. 7, the embodiment of the table 190 shown therein includes a plurality of columns 195 wherein each column represents a particular one of the choices 110 and wherein the selection identifiers 120 are provided in the appropriate column 195 based upon the choice 110 with which they are associated. As seen in FIG. 7, the selection identifier from the example shown in FIG. 4, which is 84137452, is listed in the second column 195 under the choice 110 of Candidate B.

As noted above, the ballot 125 shown in FIGS. 5A and 5B may also be employed in the method shown in FIG. 6. In that embodiment, the steps 160 and 165 would be combined, as the process of casting a vote on the ballot 125 includes filling in the appropriate empty barcode array 140 and thus choosing the selection identifier 120. In addition, in this embodiment, in step 175, the process of obtaining the selection identifier or identifiers 120 would include reading the completed barcode or barcodes 150 from the ballot 125 using an appropriate barcode reader in order to obtain the identifier represented thereby. The recorded selection identifiers 120 may then be published in the same manner as described above.

Thus, in the method shown in FIG. 6, the voters are able to verify that their votes have been counted as intended by checking that the selection identifier or identifiers that they generated and recorded for themselves appears in association with the appropriate choice (e.g., choice 110) in the voting authority publication (e.g., in the appropriate column 195 of the table 190).

While preferred embodiments of the invention have been described and illustrated above, it should be understood that these are exemplary of the invention and are not to be considered as limiting. Additions, deletions, substitutions, and other modifications can be made without departing from the spirit or scope of the present invention. For example, the preferred embodiments herein are implemented in the form of vote by mail systems. However, other systems using the ballots described herein may also be used, such as a system where the ballots are completed at a polling place and returned at the polling place in an envelope. Accordingly, the invention is not to be considered as limited by the foregoing description but is only limited by the scope of the appended claims.

What is claimed is:

1. A method of processing ballots in an election wherein a plurality of voters will cast votes in said election, the method comprising:

printing by a printing device a plurality of ballots, each ballot including a unique ballot identifier and one or more voting categories, each of said voting categories including one or more choices, each of said choices having associated therewith a selection identifier;

providing one of said ballots to each of said voters, receiving from each of said voters the ballot provided to the voter after the voter has selected on the ballot one of the choices in at least one of said one or more voting categories such that the ballot has one or more selected choices;

obtaining, using a scanning device, from each of said received ballots: (i) the ballot identifier, and (ii) the selection identifier associated with each of the one or more selected choices provided on the ballot; and publishing, using a processing device, for at least one of the ballots the ballot identifier obtained from the ballot in association with the selection identifier associated with each of the one or more selected choices obtained from the ballot in a database accessible via a network.

2. The method according to claim 1, wherein publishing further comprises including in a database accessible by said voters for each of the ballots the ballot identifier in association with the selection identifier associated with each of the one or more selected choices obtained from the ballot.

3. The method according to claim 1, further comprising storing for each of the ballots the ballot identifier in association with the selection identifier associated with each of the one or more selected choices obtained from the ballot.

4. The method according to claim 1, further comprising providing instructions to each of said voters to record the ballot identifier provided on the voter's ballot and the selection identifier associated with each of the one or more selected choices provided on the voter's ballot.

5. The method according to claim 1, wherein said election is at least partially a vote by mail election and wherein said receiving step comprises receiving in the mail from each of said voters the ballot.

6. A method of processing ballots in an election including one or more voting categories, each of said voting categories including one or more choices, wherein a plurality of voters will cast votes in said election, the method comprising:

printing, by a printing device, a plurality of ballots, each ballot including a unique ballot identifier and one or more voting categories, each of said voting categories including one or more choices, each of said choices having associated therewith a selection identifier;

providing one of said ballots to each of said voters;

receiving from each of said voters the ballot provided to the voter after the voter has selected on the ballot one of the choices in at least one of said one or more voting categories such that the ballot has one or more selected choices, wherein each ballot is received in a ballot delivery device and wherein each ballot delivery device has provided thereon the ballot identifier provided on the ballot, and the selection identifier associated with each of the one or more selected choices provided on the ballot;

obtaining, using a scanning device, from each of said received ballot delivery devices the ballot identifier and the selection identifier associated with each of the one or more selected choices; and publishing, using a processing device, for at least one of the received ballot delivery devices the ballot identifier obtained therefrom in association with the selection identifier associated with each of the one or more selected choices obtained therefrom in a database accessible via a network.

7. The method according to claim 6, wherein each of said ballot delivery devices is a return envelope.

8. The method according to claim 6, wherein publishing comprises including in a database accessible by said voters for each of the ballot delivery devices the ballot identifier in association with the selection identifier associated with each of the one or more selected choices obtained therefrom.

9. The method according to claim 6, further comprising storing for each of the ballot delivery devices the ballot identifier in association with the selection identifier associated with each of the one or more selected choices obtained therefrom.

10. The method according to claim 6, further comprising providing instructions to each of said voters to record the ballot identifier provided on the voter's ballot and the selection identifier associated with each of the one or more selected choices provided on the voter's ballot.

11. The method according to claim 6, wherein said election is at least partially a vote by mail election and wherein said receiving step comprises receiving in the mail from each of said voters the ballot.

12. A method of processing ballots in an election including one or more voting categories, each of said voting categories including one or more choices, wherein a plurality of voters will cast votes in said election, the method comprising:

printing, by a printing device, a plurality of ballots, each ballot including a unique ballot identifier and one or more voting categories, each of said voting categories including one or more choices, each of said choices having associated therewith a selection identifier;

providing one of said ballots to each of said voters;

receiving from each of said voters the ballot provided to the voter after the voter has: (i) selected on the ballot one of the choices in at least one of said one or more voting categories such that the ballot has one or more selected choices, and (ii) provided on the ballot for each of the one or more selected choices a selection identifier associated with the selected choice, wherein each said selection identifier is chosen by the voter;

obtaining, using a scanning device, from each of said received ballots the selection identifier associated with each of the one or more selected choices provided on the ballot; and publishing, by a processing device, at least one of the selection identifiers in association with the one of the choices with which it is associated in a database accessible via a network.

13. The method according to claim 12, wherein each voter chooses each said selection identifier by writing it on the voter's ballot.

14. The method according to claim 12, wherein each voter chooses each said selection identifier by creating a two dimensional barcode representing the selection identifier on the voter's ballot.

15. The method according to claim 12, wherein providing a ballot to each of said voters comprises providing a ballot having an empty barcode array adjacent to each of said choices, and wherein each two dimensional barcode is created by filling in a plurality of modules in one or more of said empty barcode arrays.

16. The method according to claim 12, further comprising storing for each of the ballots the selection identifier associated with each of the one or more selected choices provided on the ballot in association with the one of the choices with which it is associated.

17. The method according to claim 12, further comprising providing instructions to each of said voters to record the selection identifier associated with each of the one or more selected choices provided on the voter's ballot.

18. The method according to claim 12, wherein said election is at least partially a vote by mail election and wherein said receiving step comprises receiving in the mail from each of said voters the ballot received by the voter.

19. The method according to claim 12, wherein said publishing step comprises including in a database accessible by said voters each of the selection identifiers in association with the one of the choices with which it is associated.

* * * * *